F. A. BREEZE.
CLAMPING SCREW AND OPERATING MECHANISM.
APPLICATION FILED APR. 6, 1914.
1,101,397.
Patented June 23, 1914.
2 SHEETS—SHEET 1.
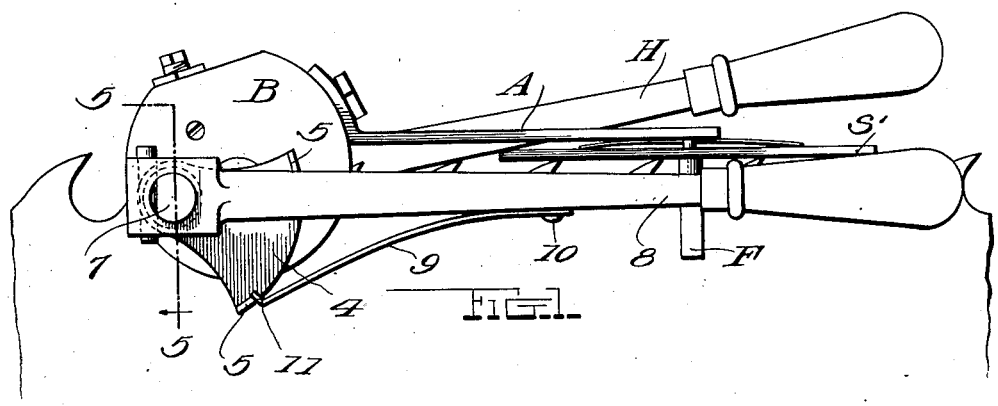
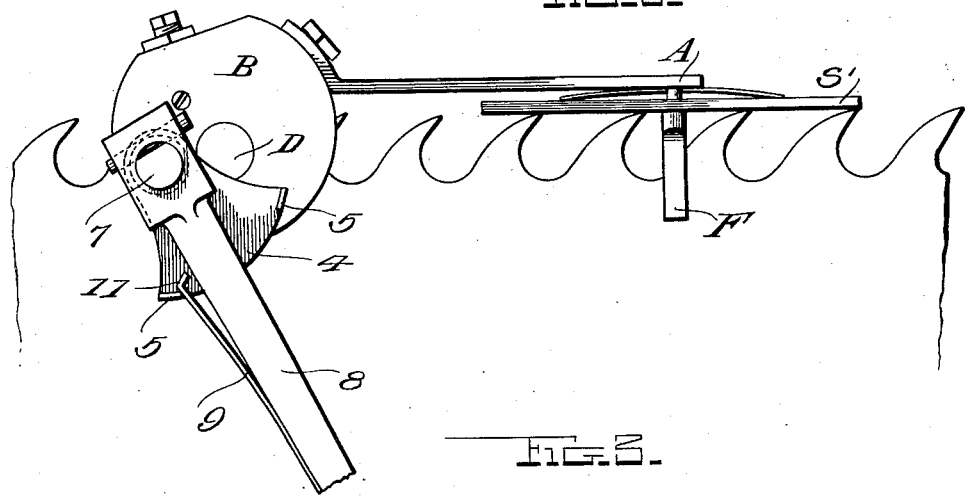
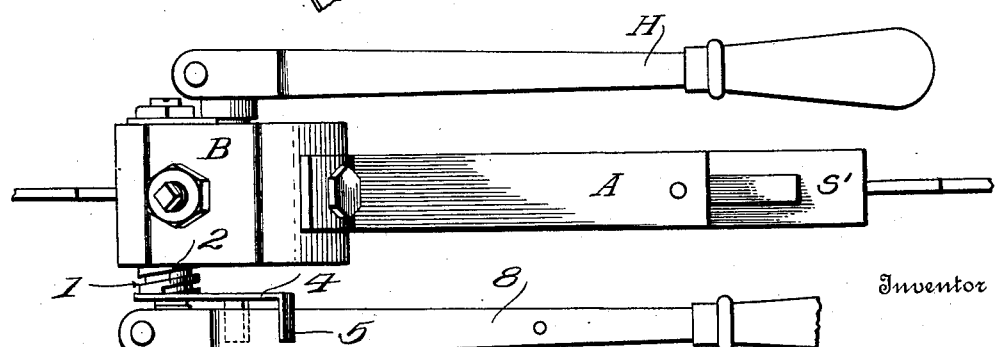
Witnesses
O. R. Pierce
H. Woodard
Inventor
F. A. Breeze
By H. B. Willson & Co.
Attorneys F. A. BREEZE.
CLAMPING SCREW AND OPERATING MECHANISM.
APPLICATION FILED APR. 6, 1914.
1,101,397.
Patented June 23, 1914.
2 SHEETS—SHEET 2.
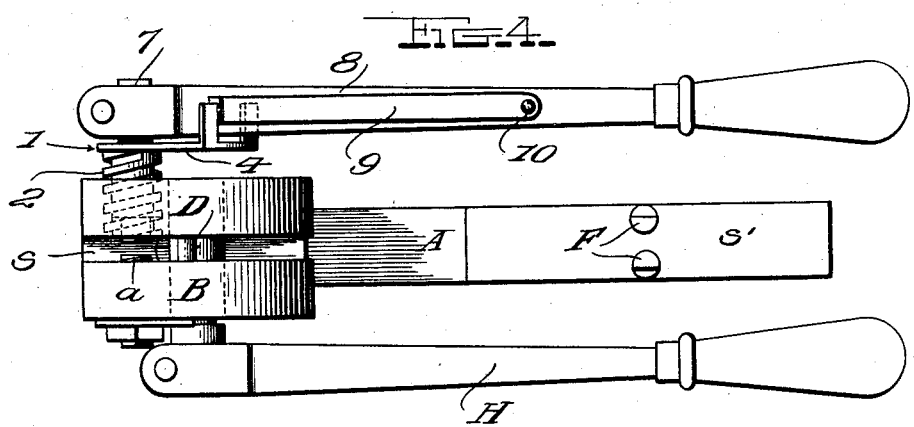
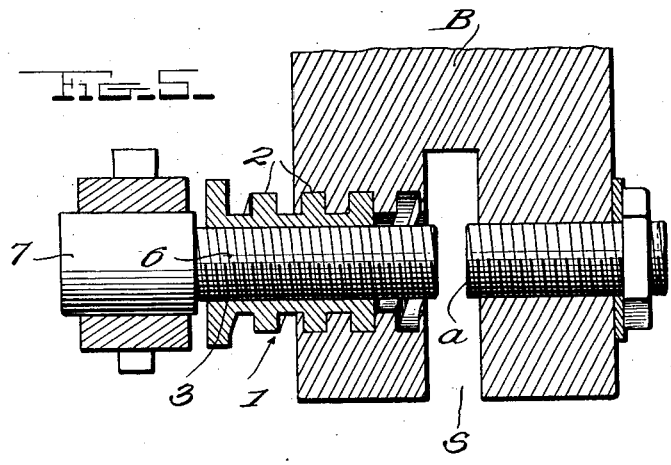
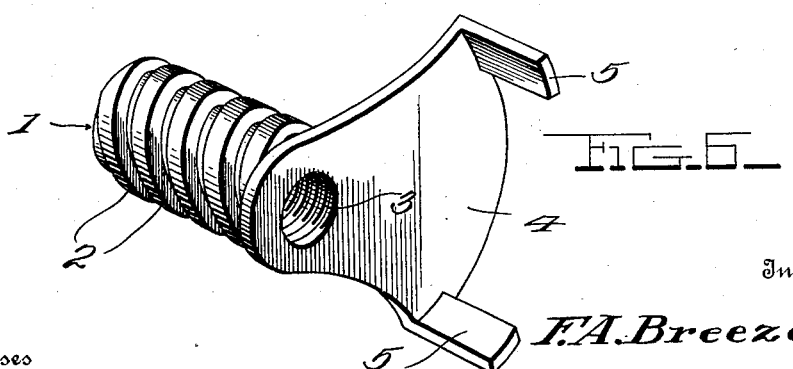
Witnesses
O. R. Pierce
H. Woodard
Inventor
F. A. Breeze.
By H. B. Willson & Co.
Attorneys

UNITED STATES PATENT OFFICE.

FRANK A. BREEZE, OF NEWBURGH, ONTARIO, CANADA.

CLAMPING-SCREW AND OPERATING MECHANISM.

1,101,397.  Specification of Letters Patent.  Patented June 23, 1914.

Application filed April 6, 1914. Serial No. 830,003.

*To all whom it may concern:*

Be it known that I, FRANK A. BREEZE, a subject of the King of Great Britain, residing at Newburgh, in the Province of Ontario and Dominion of Canada, have invented certain new and useful Improvements in Clamping-Screws and Operating Mechanism; and I do declare the following to be a full, clear, and exact description of the invention, such as will enable others skilled in the art to which it appertains to make and use the same.

This invention relates to improvements in screws and operating means therefor and more particularly to clamping screws for rigidly securing a saw swage of the character hereinafter described upon the blade of the saw being swaged. I may here state that the common type of screw has been employed heretofore for this purpose and that, although it was found to securely clamp the swage in position on the saw, the operation of projecting and retracting said screw, was found to require too much time to render it commercially practical.

The primary object of my invention, therefore, is to provide efficient means for quickly projecting and retracting a clamping screw into or out of contact with the saw blade. To this end I employ a coarsely pitched feed screw, a finely pitched power screw threaded therein and a lever secured to said power screw and having a yielding connection with said feed screw. By this construction, I am enabled to quickly move the two screws as a single unit until the free end of the power screw contacts with the saw blade, whereupon, the movement of the feed screw will be checked and the yielding connection will allow the power screw a limited amount of movement, in which to securely clamp the saw.

A secondary object is to provide a simple and efficient yielding connection between said feed and power screws, whereby the above operation is facilitated.

With the above objects in view, the invention resides in certain novel features of construction and combination herein described and claimed and shown in the drawings wherein:

Figure 1 is a side elevation of a saw swage showing the application of my invention thereto, the parts being in the position which they assume when the feed and power screws are retracted or in inoperative position; Fig. 2 is a similar view showing the position of parts when the feed and power screws are projected; Fig. 3 is a top plan view of the swage; Fig. 4 is a bottom plan view thereof; Fig. 5 is a transverse section on the plane of the line 5—5 of Fig. 1; and Fig. 6 is a detail perspective view of the feed screw and the parts carried thereby.

In the accompanying drawings, I have shown my invention as applied to a saw swage which comprises a substantially cylindrical head block B having a longitudinal slit $s$ extending from its front to its rear edge and opening at its under side. Extending rearwardly from the head block B is a rigid arm A which carries a yielding supporting shoe $s'$ which is adapted to contact with the teeth of the saw being swaged and a pair of fingers F which are adapted to straddle said saw, it being understood that the latter is passed through the slit $s$ in the head block B.

For the purpose of clamping the saw securely within the slit $s$, I provide my improved feed and power screws and their operating mechanism, which will be hereinafter described. Assuming that the saw is clamped within the slit $s$ and that the fingers F straddle said saw and that the teeth of the latter project into said slit, the teeth are then acted upon in a manner not necessary to describe, by an eccentric die D which projects across said slit and is provided with an operating handle H.

The parts so far described, form no part of the present invention, but are merely illustrated as showing one application of my invention.

Coming now more particularly to details of novelty, the feed screw comprises a sleeve 1 which is coarsely threaded on its exterior at 2 and rather finely threaded on its interior as at 3, the threads 2 interengaging similar threads formed within one side of the head block B. The outer end of the sleeve 1 carries a segmental plate 4 having laterally projecting stop studs 5 at its outer corners, said studs coming into action in a manner to appear.

Threaded into the interior of the sleeve 1 and having threads of the same pitch as the threads therein, is a power screw 6 which is adapted to co-act with an anvil block $a$ on the opposite side of the slit $s$. The outer end of the power screw 6 is provided with an integral head 7 upon which is rigidly keyed an operating lever 8 which as clearly shown in Figs. 1 and 2, is located between the studs 5 on the segmental plate 4. The lever 8 is pressed normally against one of the studs 5 by means of a flat leaf spring 9 which is riveted at 10 to said lever and has its free end bent to form a foot 11 which normally contacts with the other stud 5.

It is to be understood that the feed and power screws and the mechanism for operating the same, are employed for the purpose of clamping the saw within the slit $s$ as above suggested and to this end, the operation of the invention is as follows: When the head block is in position upon the saw blade as above described, the lever 8 may be moved downwardly, whereupon the foot 11 of the leaf spring 9 will contact with the lowermost finger 5 on the segment 4 and will therefore rotate both the feed and power screws until the free end of the power screw contacts with the saw blade. Here it will be seen that any rotary motion on the part of the sleeve 2 will be checked and that the power screw 6 is free to turn within said sleeve a distance equal to the space between the two studs 5. It is to be understood that before this operation, the anvil $a$ will have been adjusted to the proper point, according to the thickness of the saw to be swaged, and that when the action of the feed screw is checked, the continued amount of movement allowed the lever 8 will then be sufficient to allow the inner end of said power screw to be forced into binding contact with said saw and thus clamp it securely in position for the operation of the die D, as hereinbefore set forth.

I have shown and described my improved feed and power screws and the operating mechanism therefor as applied to a saw swage, but it will be readily understood that its application need not be limited to this extent since it would operate to equal advantage for any other purpose, provided the proper parts were employed for the necessary co-action.

Although I have described my invention with considerable minuteness, it will be readily understood that I need not be limited to minor details of construction, proportion and form, other than as amplified in the appended claims.

Having thus described my invention, what I claim as new and desire to secure by Letters Patent is:

1. A device of the character described, comprising a sleeve having coarsely pitched screw threads on its exterior, a plate extending laterally from one end of said sleeve, a stop projecting laterally from said plate, a power screw threaded into the bore of said sleeve, a lever rigidly secured to said power screw and means for yieldingly holding said lever in contact with said stop.

2. A device of the character described, comprising a sleeve having coarsely pitched screw threads on its exterior, a plate extending laterally from one end of said sleeve, a pair of spaced stops projecting laterally from said plate, a power screw threaded into the bore of said sleeve, a lever rigidly secured to said power screw and lying between said stops and a pressure exerting spring between said lever and one of said stops whereby the lever is forced into contact with the other stop.

3. A device of the character described, comprising a sleeve having coarsely pitched screw threads on its exterior, a plate extending laterally from one end of said sleeve, a pair of spaced stops projecting laterally from said plate, a power screw threaded into the bore of said sleeve, a lever rigidly secured to said power screw and lying between said stops and a flat leaf spring secured to said lever and having its free end bent to form a foot, said foot being in contact with one of said stops, whereby said lever is forced into contact with the other stop.

4. A device of the character described, comprising a feed screw, a power screw, a stop carried by said feed screw, an operating handle rigidly secured to said power screw and means for holding said handle in yielding contact with said stop.

In testimony whereof I have hereunto set my hand in presence of two subscribing witnesses.

FRANK A. BREEZE.

Witnesses:
　EMILY E. BILLING,
　ANNIE M. McCAMMON.